June 15, 1948.                G. F. OWENS                2,443,267
                            TAKE-UP MECHANISM
Filed June 13, 1946                                 2 Sheets—Sheet 2
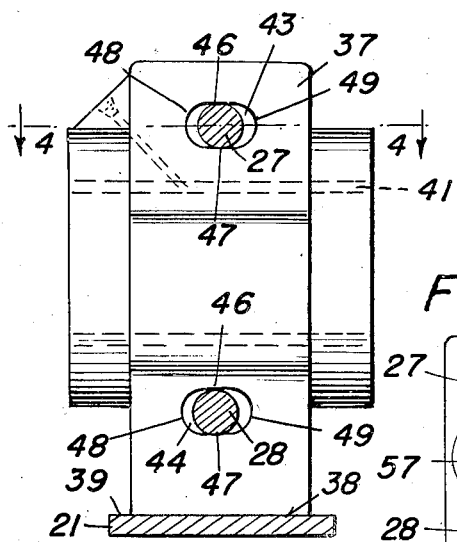
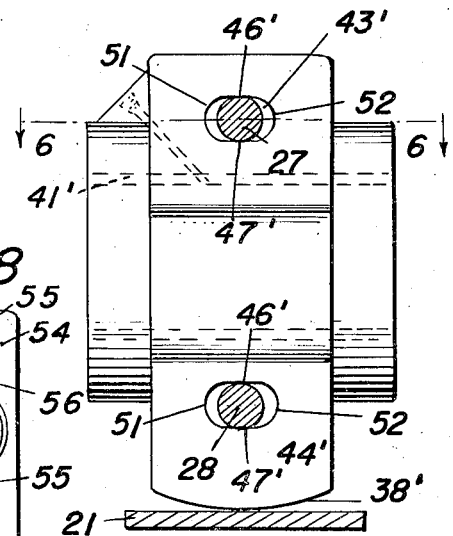
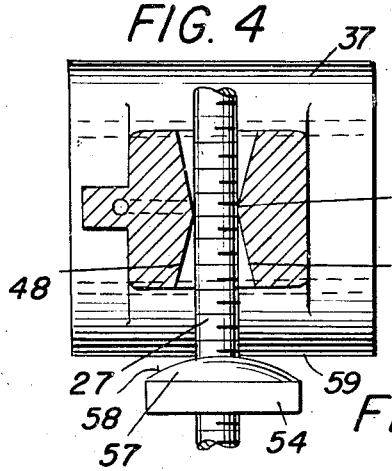
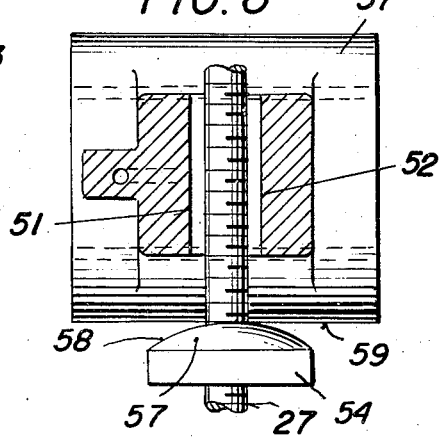
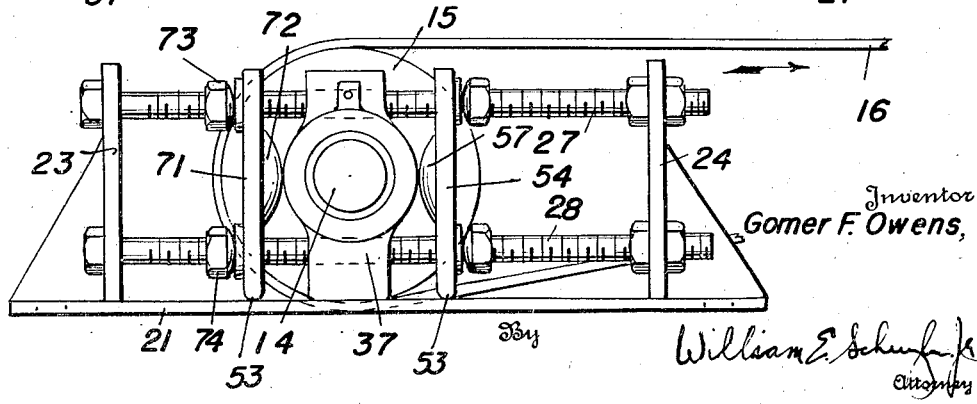
Inventor
Gomer F. Owens,
By William E. Schuyler Jr.
Attorneys Patented June 15, 1948

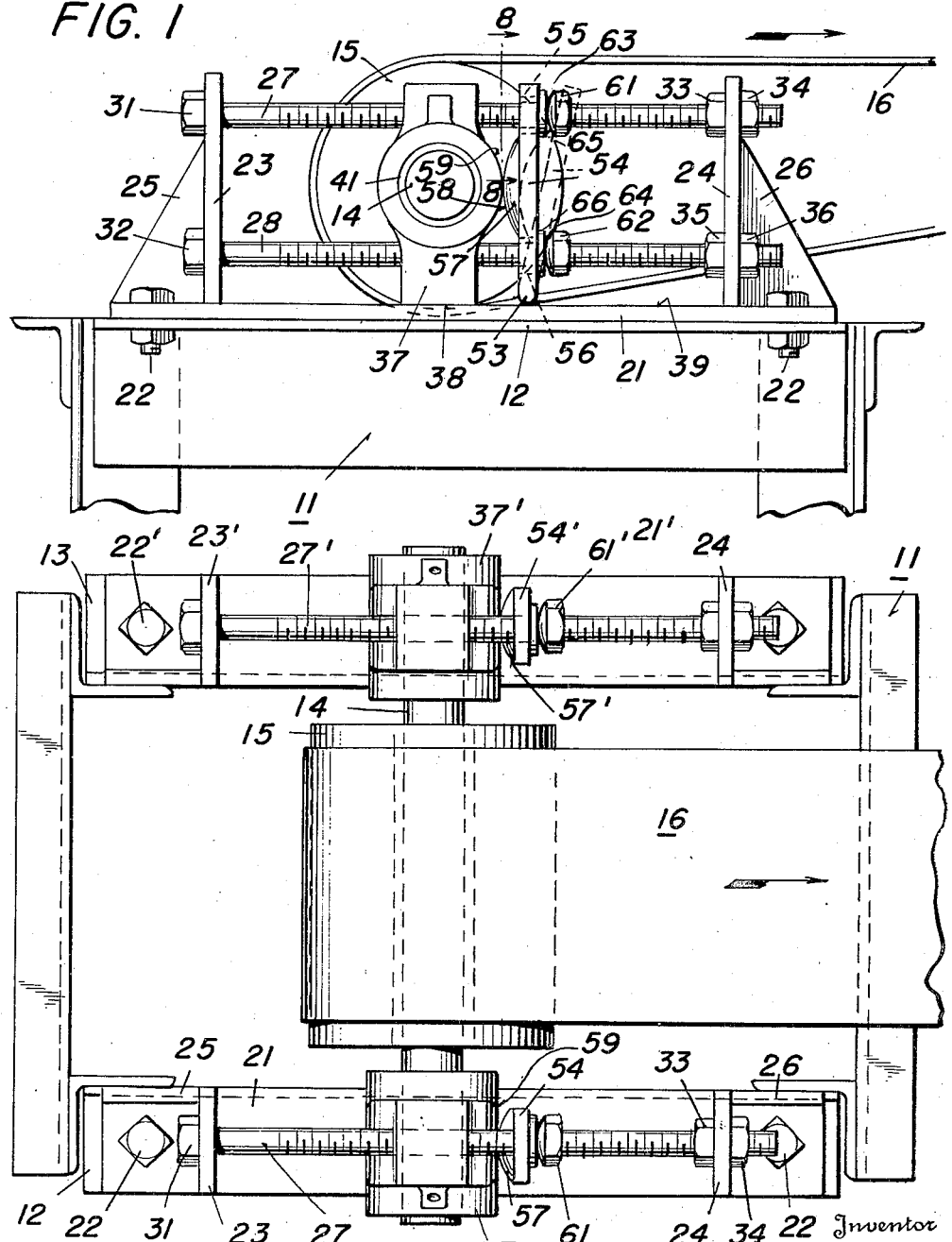

2,443,267

UNITED STATES PATENT OFFICE 2,443,267

TAKE-UP MECHANISM

Gomer F. Owens, Ellwood City, Pa., assignor to Mathews Conveyer Company, Ellwood City, Pa., a corporation of Pennsylvania Application June 13, 1946, Serial No. 676,530

12 Claims. (Cl. 74—242.14)

This invention relates to take-up mechanisms such as are used to adjust the tension or slack in a conveyer run, a belt, a chain, or other continuous element.

There are in general use several different types of take-up mechanisms. One of the more popular conveyer take-up devices has two parallel screws on a supporting base with a bearing resting on the base and adjustable along the screws. Usually nuts on the screws are adjusted to secure the bearing in proper position.

In adjusting take-up mechanisms of this type, care must be exercised to avoid misalignment of the take-up bearings and also to prevent jamming of the bearings on the take-up screws.

It is a major object of the present invention to provide an improved take-up mechanism which will permit a shaft to run free even when the bearings are misaligned.

An important object of the invention is to provide an improved take-up mechanism in which the bearing will not jam on the screws during adjustment operations.

Another object of the invention is to provide a take-up mechanism in which the bearing is securely held in any adjusted position but may turn freely in order to remain coaxial with the shaft in the bearing.

A further object of the invention is to provide a take-up mechanism in which the take-up bearing is free to move about axes in the plane of the parallel adjusting screws but in which the bearing is secured in its correctly adjusted position longitudinally of the screws.

Other and more specific objects and advantages of the invention will become apparent from the following specification and accompanying drawings, wherein—

Fig. 1 is a side elevation of a take-up mechanism embodying the invention as applied to a conveyer;

Fig. 2 is a top plan view of the apparatus shown in Fig. 1;

Fig. 3 is a vertical section through the take-up mechanism showing a bearing member which may be used in one form of the invention;

Fig. 4 is a horizontal section taken on the line 4—4 of Fig. 3;

Fig. 5 is a vertical sectional view similar to Fig. 3 but showing a modified bearing member which may be used in the take-up mechanism embodying the invention;

Fig. 6 is a horizontal section taken on the line 6—6 of Fig. 5;

Fig. 7 is a side elevation showing a modified form of a take-up mechanism embodying the invention as applied to a conveyer; and Fig. 8 is a sectional view taken on the line 8—8 of Fig. 1.

According to the invention in its preferred form, a bearing member for the take-up shaft rests on a base and is slidably guided along two screws arranged parallel to the base. Guideways formed in the bearing member cooperate with the screws to prevent turning movements of the bearing member about an axis parallel to the guiding screws or an axis normal to the plane of the screws, but permit the bearing member to turn about an axis normal to both screws. This enables the bearing to remain coaxial with a similar bearing at the other end of the take-up shaft, even though the two bearing members become misaligned.

For the purpose of securely holding the bearing properly positioned longitudinally of the screws, an abutment member is slidable on the screws and has a surface arranged to engage a surface on the bearing member. Preferably, at least one of these abutting surfaces is rounded to provide continuous engagement during relative movements of the bearing and the abutment members. Nuts on the screws may be adjusted to hold the abutment as well as the bearing in the desired position. The abutment member may have guideways cooperating with the screws to prevent turning movements about axes in the plane of the screws but at the same time permit the abutment member to turn about an axis normal to the plane of the screws. In this way, the abutment member may be adjusted over a considerable distance by turning a nut on one of the screws without the danger of jamming the abutment on the screws as it turns about an axis normal to the plane of the screws.

In a modified form of a bearing member which may be used, the lower surface of the member which rests on the base is rounded and the guideways are arranged to permit the bearing member to turn about an axis parallel to the two screws as well as about an axis normal to the two screws. Thus, the bearing member will automatically turn to remain coaxial with the shaft during both vertical and horizontal misalignment conditions of the bearing members at opposite ends of the shaft.

In some cases, particularly in reversible or inclined conveyers, it is desirable to secure the bearing members against movement in either direction longitudinally of the screws. The abutment member described above will hold the bearing in position against the normal pull of the conveyer. However, particularly in the case of inclined conveyers, a reversal of direction of the drive, may tend to move the bearing away from the abutment member. To prevent this undesired movement, a second abutment member may be placed on the opposite side of the bearing member.

For purposes of illustration, the invention is shown in the drawings as applied to a take-up mechanism for a belt conveyer. Referring to Figs. 1 and 2, the framework of the conveyer is designated generally at 11 and includes a pair of horizontal flanges 12 and 13 for supporting the two take-up mechanisms arranged at opposite sides of a take-up shaft 14. The shaft 14 carries a drum 15 supporting one end of a continuous conveyer belt 16, which may be driven from any suitable source of power. In this case the take-up mechanism is for the purpose of adjusting the tension or slack in the conveyer belt 16.

As shown particularly in Fig. 1, the take-up mechanism has a base 21 resting on the flange 12 of the frame 11 and secured thereto as by bolts 22, 22. Extending vertically upwardly from the horizontal base 21 are a pair of spaced supporting arms 23 and 24 rigidly mounted on the base 21 and reinforced by plates 25 and 26. Extending between the spaced supporting arms 23 and 24 are a pair of guiding and adjusting screws 27 and 28 (Fig. 1), securely and rigidly held in parallel relation to the base by heads 31 and 32 which engage the supporting members 23 and opposed nuts 33 and 34, and 35 and 36 which engage opposite faces of the supporting member 24.

A take-up bearing member 37 has its lower surface 38 resting on upper surface 39 of the base 21 and is slidable along the screws 27 and 28. The bearing member 37 may be provided with a bearing insert 41 of suitable material for rotatably supporting the conveyer shaft. As shown most clearly in Figs. 3 and 4, the bearing member 37 is formed with guideways in the form of holes 43 and 44 having their walls arranged to surround the screws 27 and 28 which serve as guide rails for the bearing member. The walls of the guideways 43 and 44 form a circle at the center portion 45 of the bearing member to snugly fit the outer dimensions of the screws and prevent rotation of the bearing member about an axis parallel to the screws. The horizontal walls 46 and 47 snugly fit the screws 27 and 28 throughout the length of the bearing member to prevent turning of the bearing member about the axis of the bearing insert 41; that is, about an axis normal to the plane of the screws 27 and 28. However, to permit the bearing member to turn slightly about an axis normal to the screws 27 and 28, the walls of the guideways 43 and 44 are flared in a lateral direction toward the ends of the bearing member, as shown at 48 and 49 in Figs. 3 and 4.

Since the bearing member 37 rests upon the base 21, the load on the conveyer is transmitted from the shaft 14 through the bearing member 37 to the base. Guideways 43 and 44 cooperate with screws 27 and 28 to guide the bearing member 37 as it is slidably adjusted longitudinally of the screws. The walls of the guideways shown in Figs. 3 and 4 permit the bearing 37 to turn about an axis normal to the two screws 27 and 28, but restrain the bearing member against other turning movements. This turning movement of the bearing member 37 permits it to remain coaxial with the shaft 14 and a corresponding bearing member 37' on the opposite end of the shaft even though the two bearing members are horizontally misaligned. In such a case, the shaft 14 is angularly disposed with respect to the conveyer frame 11. In some instances, such an arrangement of the shaft is essential due to distortions in the belt or variations in other parts of the apparatus.

In Figs. 5 and 6, there is shown a modified form of bearing member which is similar in most respects to the bearing member shown in Figs. 3 and 4, and like parts bear corresponding reference numerals. This modified bearing member may turn about an axis parallel to the two screws 27 and 28 as well as about an axis normal to these two screws. This is accomplished by rounding resting surface 38' so it will rest firmly on the base 21 even though the bearing member is turned about an axis parallel to the screws 27 and 28. The walls of guideways 43' and 44' are not flared but have a uniform cross section. As was the case of the bearing member shown in Fig. 3, closely spaced horizontal walls 46' and 47' snugly fit the screws 27 and 28. More widely spaced walls 51 and 52 which extend throughout the length of the bearing and, as shown most clearly in Fig. 6, form a guideway have a uniform cross section elongated in a horizontal direction throughout its length to permit the bearing member to turn about an axis parallel to the screws 27 and 28. Of course the bearing member may also turn about an axis normal to the two screws in the same manner as the bearing member shown in Fig. 3.

For the purpose of adjustably positioning the bearing member 37 longitudinally along screws 27 and 28 to control the slack or tension in the belt 16, an abutment member 54 may have a rounded lower end 53 resting on the base 21 and be formed with guideways 55 and 56 to slidably guide the abutment member 54 on the screws 27 and 28. The abutment member 54 is formed with a boss 57 which preferably has a spherically rounded surface 58 for engaging the bearing 37. As shown in Fig. 1, the bearing member has a cylindrically rounded surface 59 for engagement with the spherical surface 58 of the abutment member. The major purpose of these rounded surfaces is to maintain firm contact between the bearing member 37 and the abutment member 54 during relative movement therebetween.

As already described, the bearing member 37 may turn about an axis normal to the two screws 27 and 28 and in the case of the bearing member shown in Fig. 5 may turn about an axis parallel to the two screws. In addition, as shown in Fig. 8, the abutment member 54 has its guiding holes 55 and 56 formed with a vertically elongated uniform cross section so it may turn about an axis normal to the plane of the two screws. Obviously, a rounded abutment surface on either the bearing member 37 or the abutment member 54 would permit the described relative movement between these two members and at the same time maintain contact between the abutting surfaces. Bearing members are usually formed with straight walls or cylindrically rounded walls, so I prefer to provide a spherically rounded abutting surface on the abutment member.

To adjust the abutment member 54 as well as the bearing member 37 longitudinally of the screws 27 and 28, a pair of nuts 61 and 62 are threaded on the screws 27 and 28 and have spherical portions 63 and 64 engaging washers 65 and 66 which in turn fit against the face of the abutment member 54. It will be apparent that either of the nuts 61 or 62 may be turned to move the abutment member 54 a considerable distance over the screws 27 and 28. When only one nut is turned, the abutment member 54 becomes angularly disposed as shown in dotted lines (Fig. 1), but does not jam on the screws 27 and 28 because the vertically elongated guideways 55 and 56 permit limited turning movement about an axis normal to the plane of the screws. Furthermore, the rounded lower end 53 permits the abutment member to rest on the base 21 in all angular positions, and the spherical nuts operate smoothly even though the abutment member is not properly aligned.

In operation, take-up mechanisms are assembled on opposite sides of a conveyer frame so bearing members 37 and 37' may support take-up shaft 14. To begin the take-up adjustment, either side of the shaft may be used. Assuming the upper nut 61 on screw 27 is first turned in a direction to tighten the belt 61, that is, move the bearing 37 toward the left (Fig. 2), the abutment member will move the bearing member 37 as well as the shaft 14 in a direction to tighten the belt 16. When this occurs, the abutment member becomes angularly disposed so it slants upwardly toward the left as seen in Fig. 1, but the spherical surface 58 will maintain contact with the bearing member 37 and the rounded end 53 will continue to rest on the base 21. At the same time the shaft 14 becomes angularly disposed because the lower end, as seen in Fig. 2, is moved toward the left. However, the shaft 14 will continue to run freely because the bearing members 37 and 37' may turn in a clockwise direction, as seen in Fig. 2, about an axis normal to the two screws on which they are guided. Without affecting the operation of the conveyer belt 16, the drum 15, or the shaft 14, the lower nut 62 may now be adjusted to reset the position of the abutment 54 and at the same time move the bearing member 37 further to the left. Next, nut 61' on the other side of the conveyer may be adjusted to move abutment member 54' and bearing member 37' toward the left in a direction to restore alignment of bearing members 37 and 37'. Continued movement of the abutment member 54' may be had until the bearing member 37' is moved further to the left than the bearing member 37. Even this will not affect free running of the shaft 14 because the bearing members 37 and 37' may turn in a counter-clockwise direction, as seen in Fig. 2, about axes normal to screws 27 and 28.

By using a bearing member such as is shown in Figs. 5 and 6, fabrication of the conveyer may be facilitated because it is not essential that the take-up mechanisms on opposite sides of the conveyer frame be in exact vertical alignment. One of these mechanisms may be higher than the other and in such cases the bearing members on both sides of the conveyer will turn about axes parallel to their adjusting screws so the bearing inserts and the shaft 14 will remain coaxial even though the bearing members themselves are misaligned vertically.

As has been previously stated, reversible or inclined conveyers require the take-up shaft 14 to be secured against movement along the screws 27 and 28 in either direction. The abutment member 54, already described, acts against the normal tension of the belt 16 to prevent movement of the bearing member 37 and the shaft 14 to the right as seen in Fig. 1. In order to prevent longitudinal movement of the shaft 14 toward the left, a second abutment member 71 may be arranged, as shown in Fig. 7, on one side of the bearing member 37 opposite to the abutment member 54. The abutment member 71 is provided with a rounded abutting portion 72 and has adjusting nuts 73 and 74 operating in the same manner as adjusting nuts 61 and 62 already described.

During adjustment of the abutment member 54, nuts 73 and 74 are preferably turned along the threads of screws 27 and 28 so they will be near the extreme left of the mechanism shown in Fig. 7. After the abutment member 54 is positioned to properly adjust the slack or tension of the belt 16, the abutment member 71 is moved against the opposite side of bearing member 37 and secured there by turning nuts 73 and 74 until they are tightened. The provision of a rounded abutting surface 72 permits the same relative movements of the bearing member 37 and both abutting members 54 and 71 as have already been described in connection with the bearing member 37 and the abutment member 54.

From the foregoing description of the construction and operation of my invention, it will be apparent that the take-up mechanism is of simple construction. The base 21 provides a support on which the bearing member 37 rests to carry the load of the conveyer which is transmitted through shaft 14. The bearing member 37 slides along the base and is guided by screws 27 and 28. Guideways formed in the bearing member 37 are so shaped to retrain all movements of the bearing member except turning movements about an axis normal to the screws 27 and 28. This permits the shaft 14 to run free by retaining a coaxial relation between the bearings on opposite ends of the shaft. To permit free running of the shaft in the case of certain vertical misalignments of the bearing members 37 and 37', the walls of the guideways surrounding the screws 27 and 28 may be shaped to permit movement of the bearing member about an axis parallel to the screws. These movements are free and independent of the position of adjusting nuts which merely act through an abutment member 54 to effect proper positioning of the bearing member 37. The rounded abutting surface between the bearing member and the abutment member provides a continuing contact for various relative positions or movements between these members.

The construction is further simplified in that it requires few elements and is easily assembled. Adjustment of the take-up mechanism is facilitated because one of the adjusting nuts may be turned a considerable distance over the screw without causing jamming of the bearing member or the abutment member on the screws. In this way it is possible to turn one nut at a time and makes unnecessary former procedures of turning first one nut and then another over a very short distance or turning both nuts simultaneously.

The construction herein described and illustrated in the accompanying drawings is the preferred embodiment of the invention. As many changes could be made in this construction without departing from the scope of the invention as defined by the appended claims, it is intended that the description and drawings shall be interpreted as illustrative and not in a limiting sense.

What I claim is:

1. A take-up mechanism comprising a pair of spaced supporting arms, a pair of screws extending between said arms, a bearing member slidable along said screws, an abutment member slidable on said screws, and nuts on said screws for adjustably fixing the position of said abutment member to engage and retain said bearing member in fixed position.

2. A take-up mechanism comprising a pair of spaced arms, a pair of screws extending between said arms, a bearing member slidable along said screws, an abutment member adjustably positionable on said screws and having a surface for engaging a surface on said bearing member, at least one of said surfaces being rounded to permit relative movement between said members while engaging the other surface.

3. A take-up mechanism comprising a base, a pair of screws supported parallel to said base, a bearing member resting on said base and formed with guideways having walls to guide said bearing member along said screws, said walls having their central portion snugly fitting said screws to restrain lateral movement but flared outwardly to permit turning movement of said bearing member solely about an axis normal to said screws.

4. A take-up mechanism comprising a base, a pair of spaced screws supported parallel to said base, a bearing member formed with guideways having walls loosely engaging said screws, said bearing member having a rounded surface resting on the base to permit movement of said bearing about an axis normal to the plane of said screws, and an abutment member adjustably positionable on said screws for engaging said bearing member.

5. A take-up mechanism comprising a pair of spaced parallel screws, a bearing member slidable along said screws, an abutment member formed with guideways having walls loosely engaging said screws to slidably guide said abutment member on said screws and permit turning movement of the abutment member about an axis normal to the plane of said screws.

6. A take-up mechanism comprising a base, a pair of spaced parallel screws parallel to said base, a bearing member slidable along said screws, an abutment member having a rounded end resting on said base and formed with guideways having walls loosely engaging said screws to slidably guide said abutment member along said base and permit turning movement of the abutment member about an axis normal to the plane of said screws.

7. A take-up mechanism comprising a pair of spaced parallel screws, a bearing member slidable along said screws, an abutment member formed with guideways having walls loosely engaging said screws to slidably guide said abutment member on said screws and permit turning movement of the abutment member about an axis normal to the plane of said screws, and nuts on said screws for adjustably fixing the position of said abutment member to engage and retain said bearing member in fixed position.

8. A take-up mechanism comprising a pair of screws supported in spaced parallel relation, a bearing member slidable along said screws, an abutment member having a surface for engaging a surface on said bearing member, at least one of said surfaces being rounded to permit relative movement between said abutment member and said bearing member, said abutment member being formed with guideways having walls loosely fitting said screws to permit turning movement of the abutment member about an axis normal to the plane of said screws, and nuts for adjustably fixing the position of said abutment member on said screws to engage and retain said bearing member in a fixed position.

9. A take-up mechanism comprising a base, a pair of spaced arms projecting from said base, a pair of screws extending between said arms parallel to said base, a bearing member resting on said base and guided by said screws for sliding movement between said arms, an abutment member slidably guided by said screws, and nuts on said screws for adjustably fixing the position of said abutment member to engage and retain said bearing member in fixed position.

10. A take-up mechanism comprising a base, a pair of arms projecting from said base, a pair of screws extending between said arms parallel to said base, a bearing member resting on said base and provided with guideways having walls loosely engaging the screws to permit movement of said bearing member relative to said screws, and an abutment member formed with guideways having walls loosely engaging said screws to permit movement of the abutment member about an axis normal to the plane of said screws.

11. A take-up mechanism comprising a base, a pair of arms projecting from said base, a pair of screws extending between said arms parallel to said base, a bearing member resting on said base and provided with guideways having walls loosely engaging the screws to permit movement of said bearing member relative to said screws, an abutment member formed with guideways having walls loosely engaging said screws to permit movement of the abutment member about an axis normal to the plane of said screws, said abutment member being formed with a surface for engaging a surface on said bearing member, at least one of said surfaces being rounded to permit relative movement between said members.

12. In a take-up mechanism comprising a base, a pair of arms projecting from said base, a pair of screws extending between said arms parallel to said base, and a bearing member provided with guideways having walls loosely engaging the screws to permit movement of said bearing member relative to said screws, said bearing member having a rounded surface resting on said base permitting movement of said member about an axis parallel to said screws.

GOMER F. OWENS.

REFERENCES CITED

The following references are of record in the file of this patent:

UNITED STATES PATENTS

| Number | Name | Date |
| --- | --- | --- |
| 587,205 | Howard et al. | July 27, 1897 |
| 916,619 | Shafer | Mar. 30, 1909 |
| 2,375,304 | Kilduff | May 8, 1945 |